(12) United States Patent
Paydar et al.

(10) Patent No.: US 6,648,947 B2
(45) Date of Patent: Nov. 18, 2003

(54) METHOD AND APPARATUS FOR REPLACING A FILTER

(75) Inventors: Akbar Paydar, San Diego, CA (US); Vernon Cagan, San Diego, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 90 days.

(21) Appl. No.: 09/943,541

(22) Filed: Aug. 30, 2001

(65) Prior Publication Data

US 2003/0041731 A1 Mar. 6, 2003

(51) Int. Cl.[7] ................................................ B01D 46/00
(52) U.S. Cl. ....................... 95/278; 95/286; 55/385.1; 55/385.6; 55/422; 55/467; 55/478; 55/481; 55/483; 55/484; 55/495; 55/502; 55/506
(58) Field of Search ..................... 55/385.1, 385.2, 55/385.4, 385.6, 422, 467, 478, 480, 481, 482, 483, 484, 485, 490, 495, 502, 506, 529, 273, 286, 287

(56) References Cited

U.S. PATENT DOCUMENTS

| | | | | |
|---|---|---|---|---|
| 3,823,532 A | * | 7/1974 | Cooper et al. | ................ 55/481 |
| 4,251,245 A | * | 2/1981 | Reynolds | ...................... 55/481 |
| 4,497,642 A | * | 2/1985 | Hackney | ...................... 55/481 |
| 4,594,796 A | | 6/1986 | Gierse et al. | |
| 4,682,993 A | | 7/1987 | Todd et al. | |
| 5,356,597 A | * | 10/1994 | Wright et al. | .................. 55/422 |
| 6,007,169 A | * | 12/1999 | Li et al. | .................... 55/385.6 |
| 6,152,998 A | | 11/2000 | Taylor | |
| 6,174,349 B1 | * | 1/2001 | DeSantis | ..................... 55/481 |
| 6,419,720 B1 | * | 7/2002 | Stephens et al. | ............. 55/484 |

* cited by examiner

*Primary Examiner*—Duane Smith
*Assistant Examiner*—Jason M. Greene
(74) *Attorney, Agent, or Firm*—Meyertons Hood Kivlin Kowert & Goetzel, P.C.; B. Noël Kivlin (57) ABSTRACT

The present invention provides a method and apparatus for replacing a filter. The apparatus includes a receptacle adapted to receive a filter that is capable of filtering a first area. The apparatus further includes at least one supporting member to support at least a portion of the filter and at least a portion of a replacement filter, wherein both the filter and replacement filter are adapted to filter at least a portion of the first area for a selected duration.

35 Claims, 6 Drawing Sheets

METHOD AND APPARATUS FOR REPLACING A FILTER

BACKGROUND OF THE INVENTION

1. Field of the Invention

This invention relates generally to filtering, and, more particularly, to replacing a filter in a device.

2. Description of the Related Art

Filters are often used to remove foreign bodies, such as dust or other undesirable objects, from gases and fluids. A few examples include filters that remove grit from lubricants in an automobile engine, filters that purify drinking water, and filters that prevent dust from entering sensitive electronic devices.

Over time, the filter may accumulate foreign bodies that reduce the effectiveness of the filter. In some cases, the foreign bodies may clog the filter and slow the flow of gas or fluid through the filter. In other cases, the foreign bodies may prevent the filter from removing additional foreign bodies from the gas or fluid. Consequently, it may be desirable to replace filters periodically.

To replace a filter, one usually removes the old filter and then replaces it with a clean filter. During this process, foreign bodies may pass through the area normally covered by the filter and enter the device. These foreign bodies may damage the device, and so it may be desirable to reduce the number of foreign bodies that may enter the device while the old filter is being replaced.

The problem could be exacerbated if, during the replacement process, gas or fluid continues to flow through the area typically covered by the filter. Moving air, for example, can be used to cool electronic components in devices such as large-scale computer systems and mid-range network servers used by some businesses to distribute product data to customers, take orders, and enhance communications with employees. The moving air could carry dust particles into the device when the old filter is removed.

One way to reduce the number of foreign bodies that enter the device may be to slow the flow of gas or fluid. For example, an air conditioner or electronic device may be deactivated to reduce the number of dust particles that enter the device while replacing a filter. However, deactivating the device may not always be practical. For example, deactivating a mid-range network server may disrupt the services provided by the business running the device.

SUMMARY OF THE INVENTION

In one aspect of the instant invention, an apparatus is provided for replacing a filter. The apparatus includes a receptacle adapted to receive a filter that is capable of filtering a first area. The apparatus further includes at least one supporting member to support at least a portion of the filter and at least a portion of a replacement filter, wherein both the filter and replacement filter are adapted to filter at least a portion of the first area for a selected duration.

In one aspect of the present invention, a method is provided for replacing a filter. The method includes filtering a first region in a system using a first filter. The method further includes replacing the first filter with a second filter, wherein at least a portion of the first filter and at least a portion of the second filter the first region during replacement.

BRIEF DESCRIPTION OF THE DRAWINGS

The invention may be understood by reference to the following description taken in conjunction with the accompanying drawings, in which like reference numerals identify like elements, and in which.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
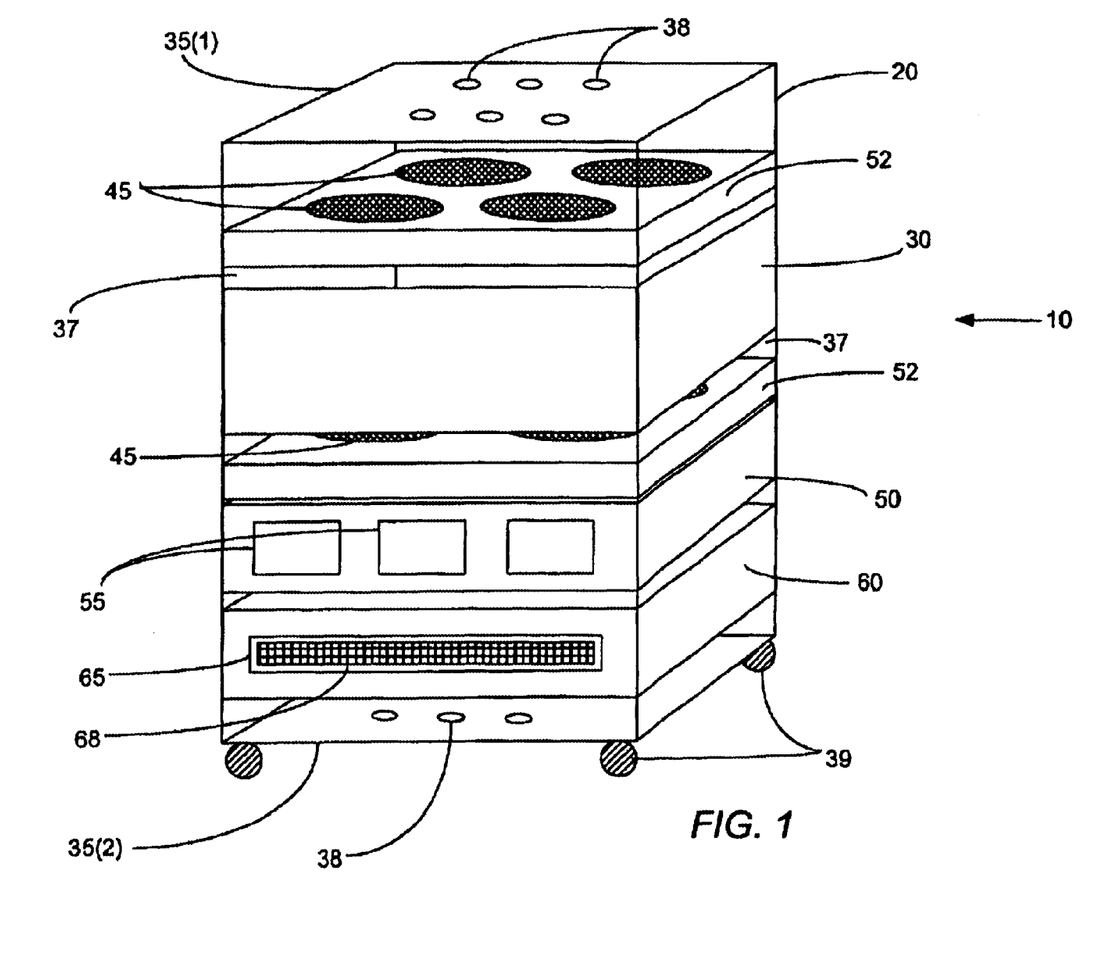
FIG. 1 shows one embodiment of a system in accordance with the present invention.

Referring now to FIG. 1, a stylized diagram of a system 10 in accordance with one embodiment of the present invention is illustrated. The system 10, in one embodiment, includes a system cabinet 20 that comprises at least an upper panel 35(1), a lower panel 35(2), and four vertical panels 37. For ease of illustration and to provide a more insightful view, the panels 37 have been made transparent. The panels 35(1–2), 37 may be formed from any suitable material including metal, plastic, and the like.

In one embodiment, one or more openings 38 may allow air to pass through the upper and lower panels 35(1–2). The openings 38 may be positioned in any desirable manner in the system cabinet 20. To allow air to reach the openings 38 underneath the system cabinet 20, the system cabinet 20 may rest on a plurality of supporting members 39. Some examples of supporting members 39 might include wheels or castors that may allow the system cabinet 20 to be moved.

In the illustrated embodiment, the system 10 includes a plurality of system boards 30 that may include one or more processors (not shown). The system boards 30 may be placed in any desirable location in the system cabinet 20. In the illustrated embodiment, the system 10 may also include a power layer 50 that may be positioned in the system cabinet 20 in any desirable manner. The power layer 50 may contain one or more power supplies 55 that may supply power to operate devices in the system 10, including, but not limited, to the system boards 30.

When operational, the system boards 30 and the power supplies 55 in the power layer 50 may generate heat, and thus it may be desirable to regulate the temperature within the system 10. To that end, the system 10, in one embodiment, includes two fan trays 52 located above and below the system boards 30. It should, however, be appreciated that, in other embodiments, the system 10 may utilize different numbers of fan trays 52 positioned at any desirable location in the system 10.

Each fan tray 52 may include one or more fans 45 to regulate the flow of air in the system 10. For example, in the illustrated embodiment, the one or more fans 45 may draw air into the system 10 through the openings 38 in the lower panel 35(2), direct the air through the power layer 50 and past the system boards 30, and then expel the air through openings 38 in the upper panel 35(1) of the system cabinet 20. It should, however, be appreciated that, in other embodiments, air may enter or exit the system cabinet 20 through other openings and may follow different paths through system 10.

The air drawn into the system 10 by the one or more fans 45 may contain foreign bodies such as dust from the floor beneath the system cabinet 20. These bodies can damage electronic devices on the system boards 30, and so it may be desirable to reduce the number of the foreign bodies that can enter the system 10. Consequently, in one embodiment, the system cabinet 20 may contain a filter tray 60 to trap, or otherwise filter, at least a portion of the foreign bodies that may enter the system 10. The term "filter", as utilized herein, refers to removing some or all of the foreign bodies carried in the air. The filter tray 60, in alternate embodiments, may be located at a variety of positions within the system 10. For example, in one embodiment, the filter tray 60 may be positioned such that the bottom surface of the filter tray 60 forms the lower panel 35(2) of the system cabinet 20.

The filter tray 60 may contain a filter receptacle 65 adapted to receive a filter 68. In other embodiments, multiple filter receptacles 65 may be added to receive additional filters 68. When placed in the filter receptacle 65, the filter 68 may reduce the number of foreign bodies present in the air that pass through the filter 68. Over time, the filter 68 may accumulate foreign bodies, which may reduce its effectiveness. As such, it may be desirable to periodically replace the filter 68. In accordance with one embodiment of the present invention and as explained in more detail below, the filter 68 may be replaced while preventing, or at least reducing the number of, foreign bodies entering the system 10.

Figure 2:
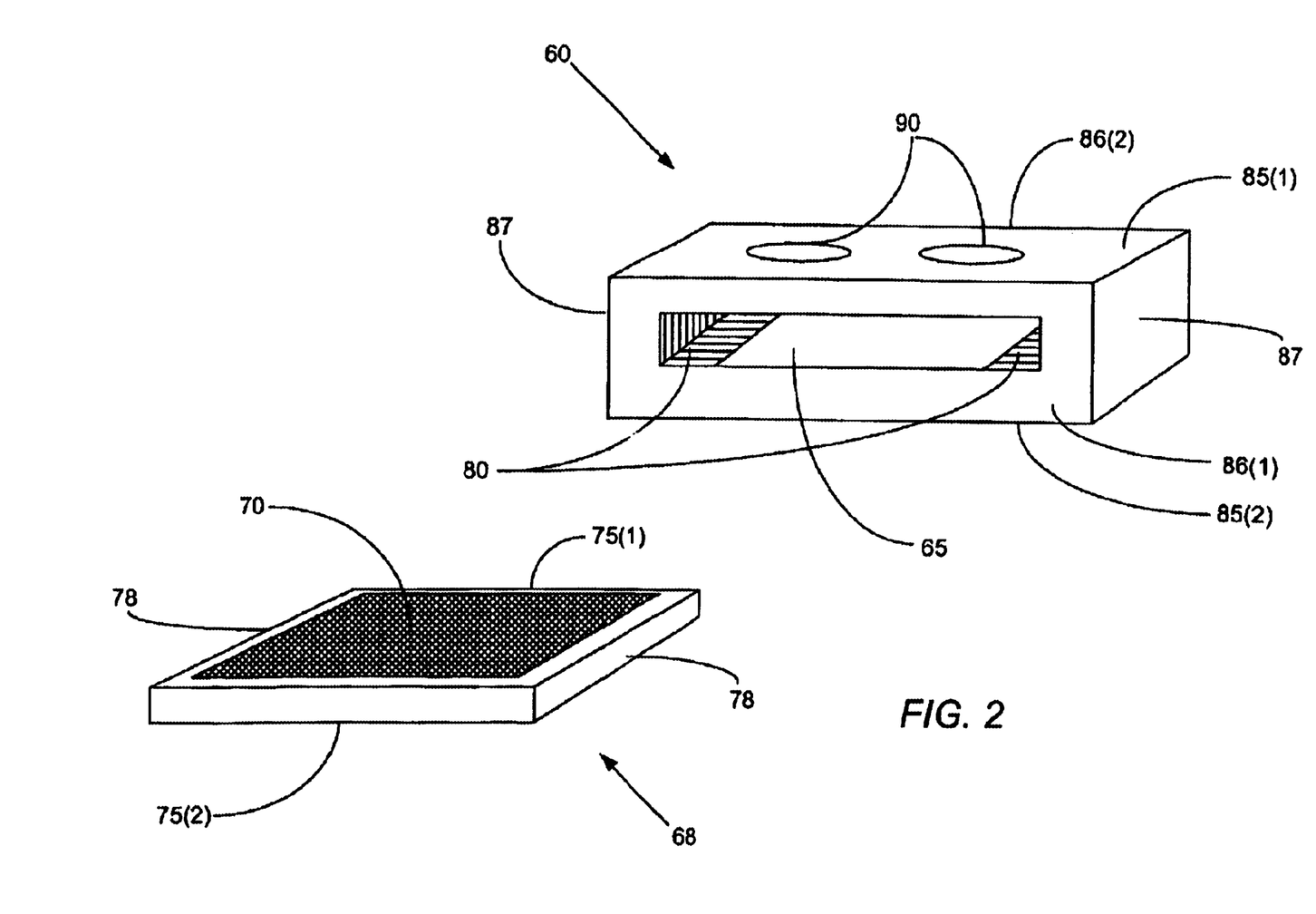
FIG. 2 depicts a filter and a filter tray that may be employed in the system of FIG. 1, in accordance with one embodiment of the present invention.

FIG. 2 shows a stylized diagram of one embodiment of the filter tray 60, including the filter receptacle 65 that may be adapted to receive the filter 68. The filter 68, in one embodiment, may comprise a filtering screen 70 positioned in a frame formed from a front end 75(1), a back end 75(2), and two side members 78. The shape and size of the filter 68 may vary from one implementation to another. The filtering screen 70 may be formed from any suitable material including polyurethane or other porous materials. The size of the openings (not shown) in the filtering screen 70 may be adjusted to remove foreign bodies of a particular size. For example, in one embodiment, a ¼ inch layer of polyurethane foam that contains about 25 pores per inch may be used to filter dust particles. The initial resistance of the polyurethane foam, in one embodiment, may be about 0.03 inches water gauge and the average synthetic dust weight arrestance of the polyurethane foam may be about 63 percent. The front end 75(1), back end 75(2), and two side members 78 may be formed from metal, plastic, and the like.

The filter tray 60, in one embodiment, may comprise an upper panel 85(1), a lower panel 85(2), a front panel 86(1), a back panel 86(2), and two side panels 87. The panels 85(1–2), 86(1–2), and 87 may be made of any suitable material. One or more openings 90 in the upper panel 85(1) and the lower panel 85(2) may allow air to pass through the filter receptacle 65.

In one embodiment, the filter 68 may enter the filter receptacle 65 through the front panel 86(1) and exit through the rear panel 86(2). The filter receptacle 65 may be symmetric such that the filter 68 may also enter the filter receptacle 65 through the rear panel 86(2) and exit through the front panel 86(1). One or more filter supports 80 may be positioned inside the filter receptacle 65 to hold the filter 68 in place within the filter receptacle 65. The one or more filter supports 80 may allow the filter 68 to slide through the filter receptacle 65. Examples of the filter supports 80 may include tracks, rails, or U-shaped guides that mate to the vertical members 78. It should, however, be appreciated that, the filter supports 80 may not be necessary in all embodiments. For example, in other embodiments, the filter 68 may be positioned or secured in place by an appropriately sized filter receptacle 65 in the filter tray 60.

Although the illustrated embodiment of the filter tray 60 includes the panels 86(1–2) and 87, and the filter receptacle 65 having the filter supports 80, it should, however, be appreciated that in other embodiments the filter tray 60 may include fewer or additional components. For example, in one embodiment, the filter tray may be formed of the filter receptacle 65 having the filter supports 80 positioned in the system cabinet 20. In this example, the upper and lower panels 85(1–2) may be omitted and thus the air may flow from the openings 38, through the filter 68, and into the system 10. In alternate embodiments, the filter receptacle 65 may include a cover plate (not shown) adapted to prevent air from entering the filter receptacle 65 through the front and rear panels 86(1–2).

Figure 3A:
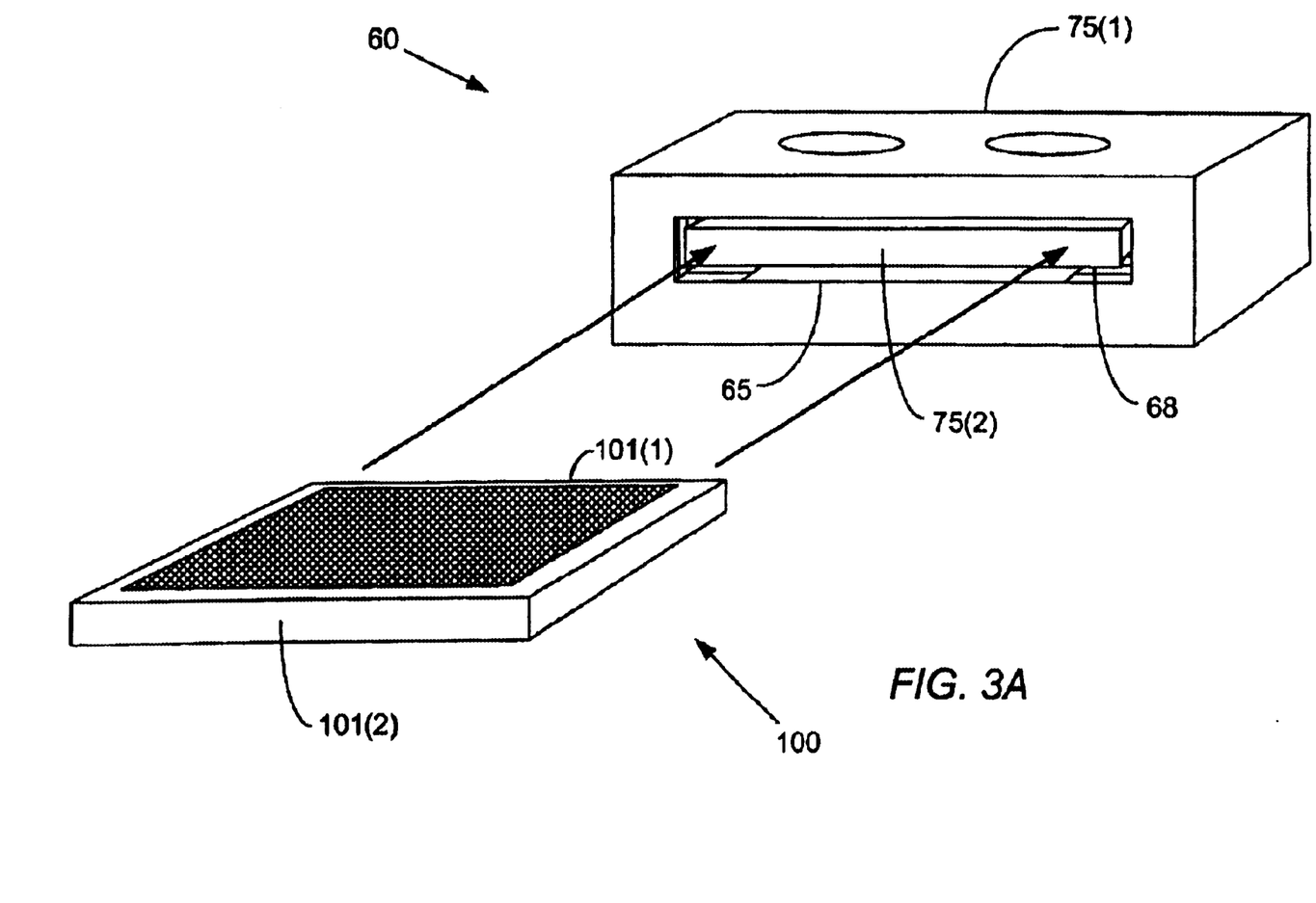
FIGS. 3A and 3B illustrate a method of replacing a filter by a replacement filter in the filter tray shown in FIG. 2, in accordance with one embodiment of the present invention.
Figure 3B:
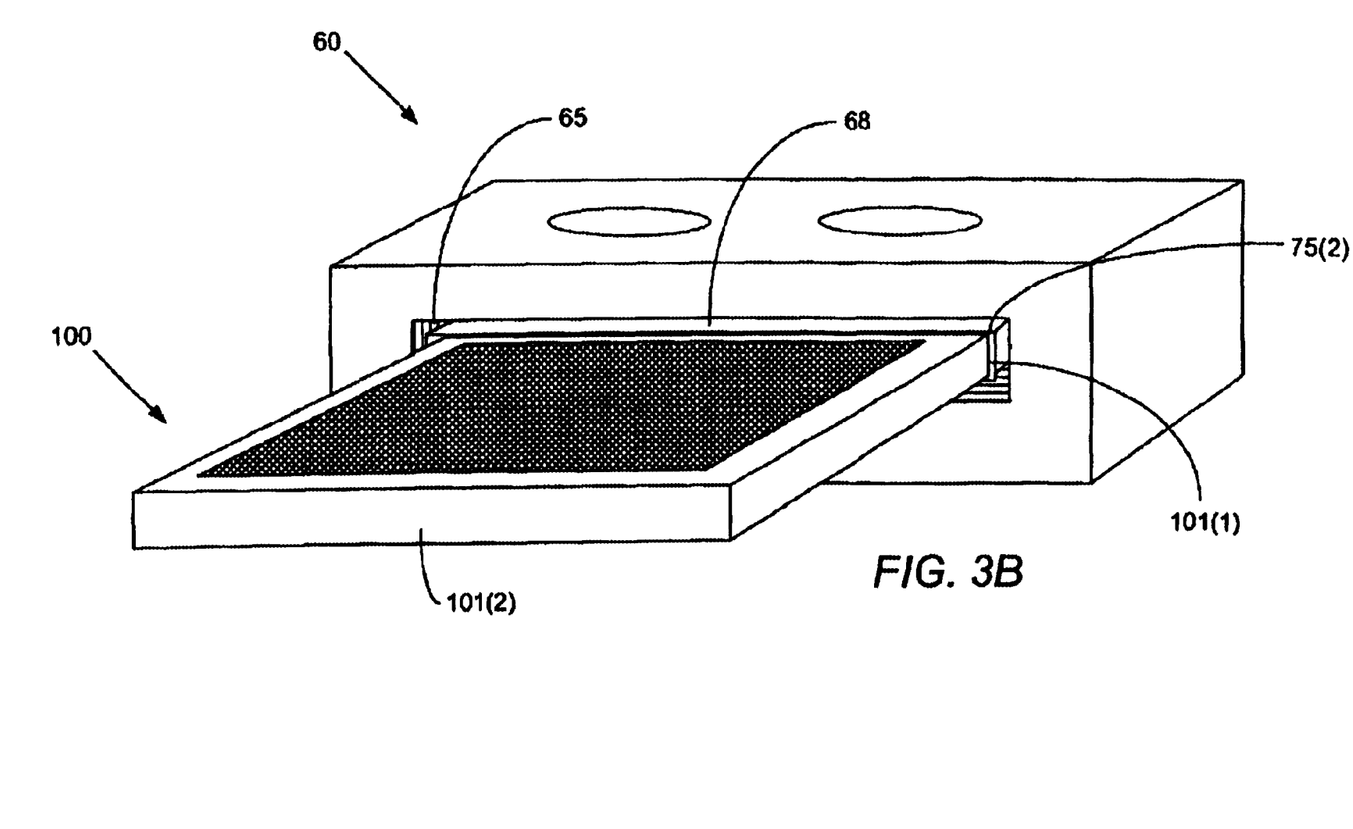

Referring now to FIGS. 3A and 3B, an exemplary method of replacing the filter 68 with a replacement filter 100 is illustrated. As shown in FIG. 3A, the filter receptacle 65 includes the filter 68 inserted therein. Over time, the filter 68 may become dirty, and it may thus be desirable to replace the filter 68. At such a time, the replacement filter 100 may be inserted into the filter receptacle 65. To replace the filter 68, a front end 101(1) of the replacement filter 100 may be aligned with the back end 75(2) of the filter 68, as shown in FIG. 3B.

As illustrated in FIG. 3B, a front end 101(1) of the replacement filter 100 may be brought into contact with the back end 75(2) of the filter 68. The front end 101(1) and the back end 75(2) of the respective filters 100, 68 may form a seal that prevents, or at least reduces the number of, foreign bodies from passing between the back end 75(2) of the filter 68 and the front end 101 (1) of the replacement filter 100. The front end 75(1) and the back end 75(2) of the filter 68, as well as the front end 101(1) and back end 101(2) of the replacement filter 100, may be constructed in any manner that permits the filter 68 and replacement filter 100 to form an adequate seal. For example, in one embodiment, the front and back ends 75,101 of the respective filters 68, 100 may include flexible members, such as a rubber surface, or mating surfaces, such as interlocking teeth, that, when placed adjacent each other, form a seal that prevents, or at least reduces the number of, foreign bodies from entering the system 10 (see FIG. 1).

Figure 4:
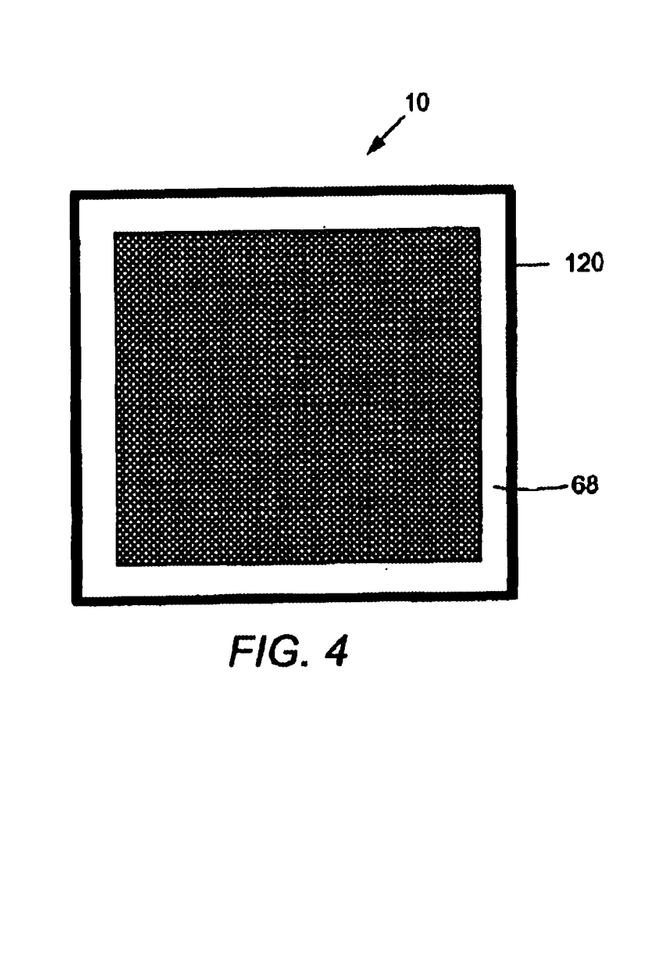
FIG. 4 shows a cross sectional top view of an area within the system of FIG. 1 that may be filtered by the filter shown in FIG. 2, in accordance with one embodiment of the present invention.

To clarify some aspects of this embodiment of the present invention, FIG. 4 depicts a cross sectional top view of the system 10 adjacent the filter 68, which covers a filtered area 120. Air passing through the filter tray 60 (see FIG. 1) may be channeled into the filtered area 120. In the illustrated embodiment, the filter 68 covers the filtered area 120 and may remove some or all of the foreign bodies carried by the air.

Figure 5:
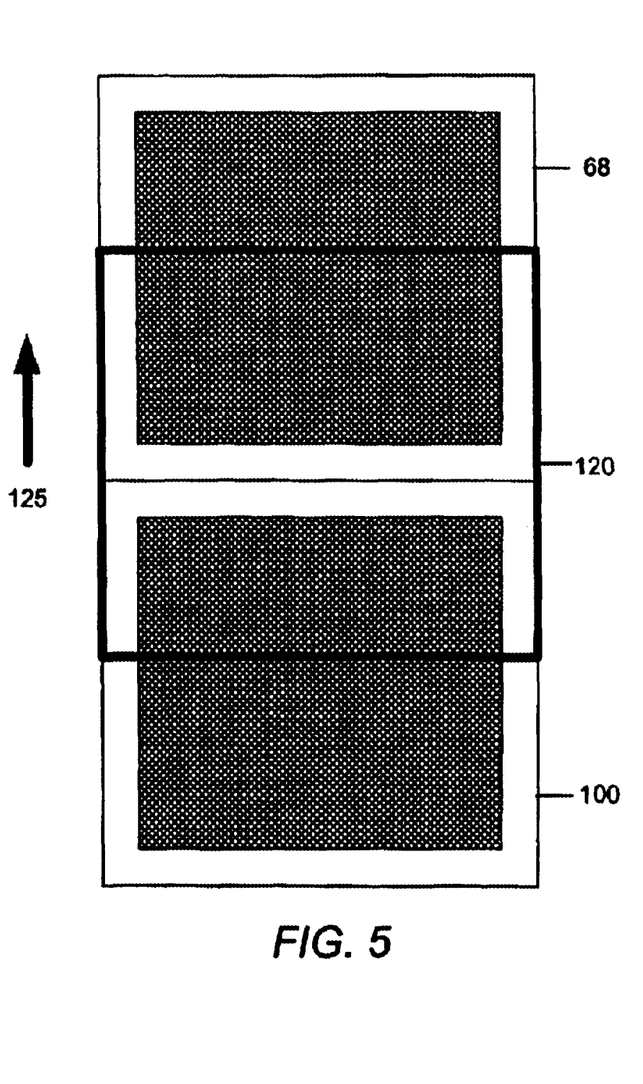
FIG. 5 shows a cross sectional top view of the filter and the replacement filter of FIG. 3a over the filtered area of FIG. 4, in accordance with one embodiment of the present invention.

FIG. 5 shows a top view of the filter 68 and the replacement filter 100 of FIG. 3A over the filtered area 120 of FIG. 4. In the illustrated embodiment, as the replacement filter 100 is pushed through the filter receptacle 65 (see FIG. 4) in a direction indicated by an arrow 125, both the filter 68 and the replacement filter 100 may cover a portion of the filtered area 120 for a selected time interval. Thus, during this selected time interval, the filters 68, 100 may collectively aid in removing at least a portion of the foreign bodies from the air that passes through the filtered area 120. Furthermore, during the filter replacement process, the seal formed between the two filters 68, 100 may prevent, or at least reduce the number of, foreign bodies passing through the filtered area 120.

Figure 6:
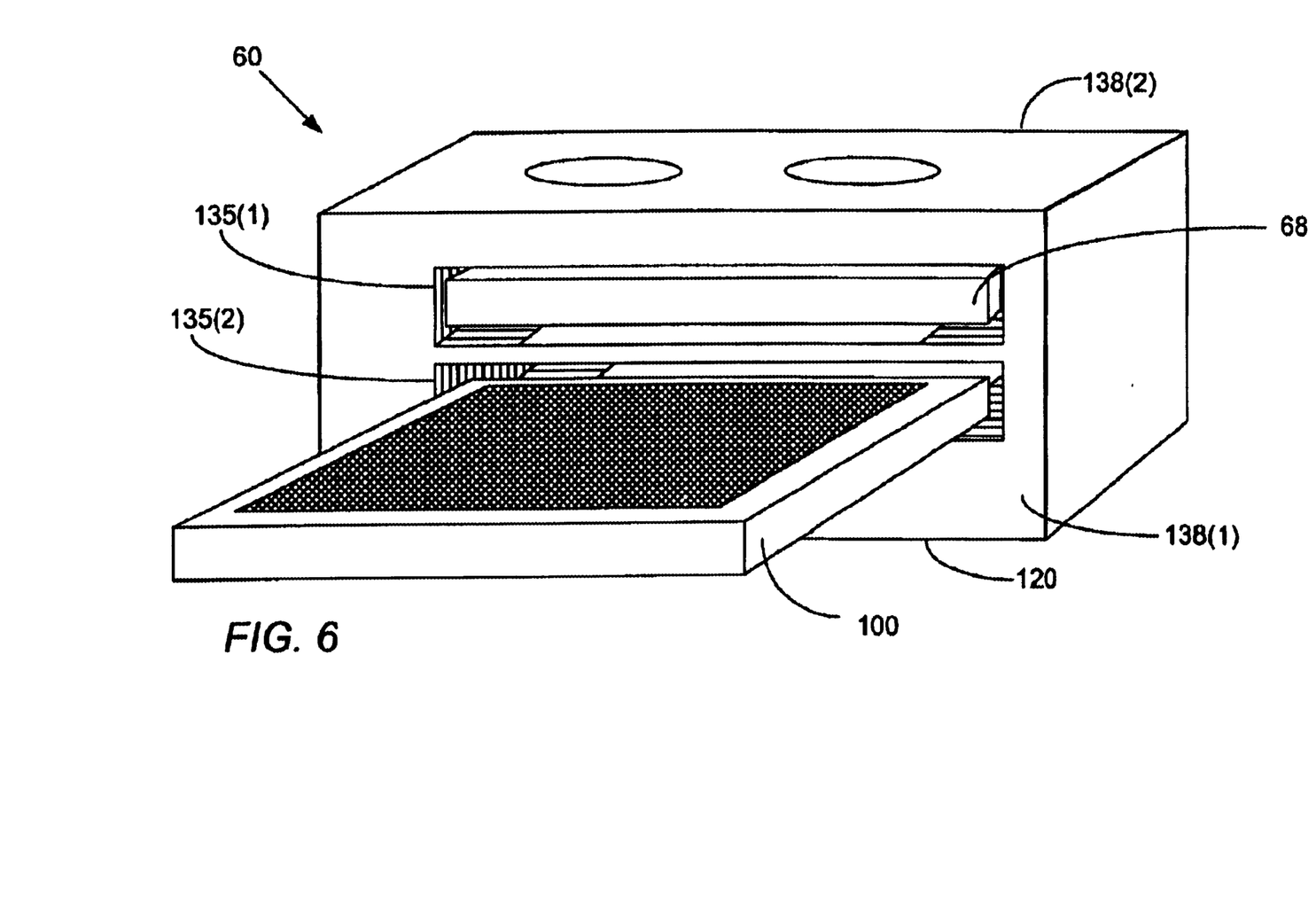
FIG. 6 depicts an alternative embodiment of the filter tray of FIG. 2 that may be employed in the system of FIG. 1, in accordance with the present invention.

FIG. 6 depicts an alternative embodiment of the filter tray 60 (see FIG. 1), in accordance with the present invention. In this embodiment, the filter tray 60 may be adapted to include an upper filter receptacle 135(1) and a lower filter receptacle 135(2) located on different planes in the filter tray 60, but with both opening onto at least a front panel 138(1). Both the upper filter receptacle 135(1) and the lower filter receptacle 135(2) may be adapted to receive the filter 68. In the present embodiment, the upper filter receptacle 135(1) of the filter tray 60 includes the filter 68. If it should become desirable to replace the filter 68, the replacement filter 100 may be inserted into the lower filter receptacle 135(2) through the front panel 138(1) of the filter tray 60. In accordance with the illustrated embodiment of the present invention, the filter 68 may be removed through either the front panel 138(1) or the back panel 138(2) of the filter tray 60. While the filter 68 is being replaced, the filter 68 and the replacement filter 100 may each cover a portion of the filtered area (see FIG. 6) and remove some or all of the foreign bodies carried by the air passing through the upper and lower filter receptacles 135 (1-2) of the filter tray 60. Although not necessary, in this embodiment, the symmetry of the upper and lower filter receptacles 135 may allow the filter 68 and replacement filter 100 to enter or exit the filter tray 60 through either the front panel 138(1) or the back panel 138(2).

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. An apparatus, comprising:
    a receptacle adapted to receive a filter that is capable of filtering a first area; and
    at least one supporting member to support at least a portion of the filter and at least a portion of a replacement filter, wherein both the filter and replacement filter are adapted to filter at least a portion of the first area for a selected duration, wherein the filter and the replacement filter have teeth on a front end and a back end of the filter and the replacement filter, wherein the teeth on the front end of the filter interlock with the teeth on the back end of the replacement filter during the selected duration.

2. The apparatus of claim 1, wherein the receptacle is adapted to allow the filter and the replacement filter to be inserted into the apparatus from either a first end or an opposite end of the apparatus.

3. The apparatus of claim 2, wherein the supporting members are adapted to allow the filter and the replacement filter to slide through the receptacle.

4. The apparatus of claim 2, wherein at least one of the supporting members is adapted to allow adjacent ends of the two filters to form a seal that reduces the number of foreign bodies passing between the two ends of the two filters as the two filters slide through the receptacle.

5. The apparatus of claim 1, further comprising a plurality of receptacles adapted to receive a plurality of filters.

6. The apparatus of claim 1, further comprising one or more panels positioned above and below the receptacle.

7. The apparatus of claim 1, wherein the selected duration comprises the time until the first filter substantially exits the apparatus.

8. An apparatus, comprising:
    a receptacle adapted to receive a portion of a first and second filter; and
    one or more supporting members adapted to allow placement of a first end of the second filter adjacent to a first end of the first filter and to allow movement of the first filter using the second filter until the first filter substantially exits the apparatus, wherein the first filter and the second filter have rubber on the first end of the first filter and first end of the second filter, wherein the rubber on the first end of the first filter seals with the rubber on the first end of the second filter during the movement of the first filter.

9. The apparatus of claim 8, wherein the receptacle allows the first filter and the second filter to enter or exit the apparatus through either a first end or an opposite end of the receptacle.

10. The apparatus of claim 9, wherein the one or more supporting members are adapted to allow the first filter and the second filter to slide through the receptacle and to allow the ends of the two filters to form a seal to reduce the number of foreign bodies passing between the two filters during replacement.

11. The apparatus of claim 8, further comprising a plurality of receptacles adapted to receive a plurality of filters.

12. The apparatus of claim 8, further comprising one or more panels positioned above and below the receptacle.

13. A method, comprising:
    filtering a first region in a system using a first filter;
    interlocking teeth between the first filter and a second filter; and replacing the first filter with the second filter, wherein at least a portion of the first filter and at least a portion of the second filter filter the first region during replacement.

14. The method of claim 13, wherein replacing the first filter comprises applying a force using the second filter to replace the first filter.

15. The method of claim 14, wherein, replacing the first filter comprises placing the second filter substantially adjacent to the first filter before applying the force.

16. The method of claim 15, wherein placing the second filter comprises substantially aligning the two filters to create a seal that reduces the number of foreign bodies passing between the first filter and the second filter.

17. The method of claim 15, wherein applying the force comprises applying the force in a horizontal direction from a first end of the system until the first filter substantially exits from an opposite end of the system.

18. The method of claim 17, wherein applying the force comprises applying the force in a horizontal direction from the opposite end of the system until the first filter exits from the first end of the system.

19. The method of claim 13, further comprising filtering the region using a plurality of filters and replacing the plurality of filters with a plurality of replacement filters.

20. The method of claim 13, wherein replacing the first filter comprises placing the second filter on a different plane from the first filter and removing the first filter.

21. A method for replacing a filter in a system, comprising:

placing a first end of a replacement filter adjacent a first end of the filter in the system;

forming a seal between the replacement filter and the filter; and moving a first filter using a second filter until the first filter substantially exits the system.

22. The method of claim 21, wherein placing the first end of the replacement filter comprises substantially aligning the first and second filters to create a seal that reduces the number of foreign bodies passing between the two ends of the two filters.

23. The method of claim 21, wherein moving the first filter comprises applying a force in a horizontal direction until the first filter substantially exits the system.

24. A system, comprising:

at least one electronic component;

a filter receptacle adapted to receive at least a portion of a first filter and to receive at least a portion of a replacement filter, wherein the receptacle is adapted to allow the portions of the first filter and the replacement filter to provide filtered air in the system; and at least one fan adapted to provide air to the one or more electronic components.

25. The system of claim 24, wherein the receptacle comprises at least one supporting member adapted to support at least a portion of the first filter and at least a portion of the replacement filter.

26. The system of claim 21, wherein the supporting member permits the filter and replacement filter to slide through the receptacle.

27. The system of claim 26, wherein the receptacle permits the filter and replacement filter to be inserted into the system from a first end of the receptacle or an opposite end of the receptacle.

28. The system of claim 24, further comprising a system cabinet adapted to admit and expel air from the system.

29. The system of claim 28, wherein the at least one fan is adapted to draw air into the system cabinet, provide filtered air to the electronic components, and push the air out of the system cabinet.

30. The system of claim 24, wherein the at least a portion of the first filter and the at least a portion of the replacement filter have teeth, wherein the teeth interlock when the at least a portion of the first filter and the at least a portion of the replacement filter provide filtered air in the system.

31. The system of claim 24, wherein the at least a portion of the first filter and the at least a portion of the replacement filter have rubber ends, wherein the rubber ends form a seal between the first filter and the replacement filter when the at least a portion of the first filter and the at least a portion of the replacement filter provide filtered air in the system.

32. The apparatus of claim 1, further comprising:

at least one system board coupled to the receptacle, wherein the system board, receptacle, and supporting member are comprised in a cabinet.

33. The apparatus of claim 32, further comprising:

at least one fan tray positioned in the cabinet relative to the filter, wherein the fan tray moves air through the filter to cool the at least one system board.

34. The apparatus of claim 32, further comprising:

at least one supporting member on a bottom of the cabinet; and at least one hole in the bottom of the cabinet, wherein the at least one supporting member and the at least one hole allow air from the bottom of the cabinet to be moved through the filter.

35. The apparatus of claim 1, wherein the filter and replacement filter are not latched before, during, or after the selected duration.

\* \* \* \* \*

UNITED STATES PATENT AND TRADEMARK OFFICE
CERTIFICATE OF CORRECTION

PATENT NO. : 6,648,947 B2
DATED : November 18., 2003
INVENTOR(S) : Paydar et al.

It is certified that error appears in the above-identified patent and that said Letters Patent is hereby corrected as shown below:

Column 8,
Line 1, please replace "claim 21" with -- claim 25 --.

Signed and Sealed this

First Day of June, 2004

JON W. DUDAS
*Acting Director of the United States Patent and Trademark Office*